US012265036B2

(12) United States Patent
Alpeter

(10) Patent No.: US 12,265,036 B2
(45) Date of Patent: Apr. 1, 2025

(54) DETECTION AND REMOVAL ASSESSMENT (DARA) SYSTEM OF STANDARDS FOR SORTING SYSTEMS

(71) Applicant: PARACLETE SOLUTIONS, Victoria, TX (US)

(72) Inventor: Mark Alpeter, Victoria, TX (US)

(73) Assignee: PARACLETE SOLUTIONS, Victoria, TX (US)

( * ) Notice: Subject to any disclaimer, the term of this patent is extended or adjusted under 35 U.S.C. 154(b) by 303 days.

(21) Appl. No.: 17/982,560

(22) Filed: Nov. 8, 2022

(65) Prior Publication Data
US 2024/0151652 A1 May 9, 2024

(51) Int. Cl.
G01N 21/93 (2006.01)
B07C 5/342 (2006.01)

(52) U.S. Cl.
CPC ........... G01N 21/93 (2013.01); B07C 5/3427 (2013.01)

(58) Field of Classification Search
CPC ...... G01N 21/93; B07C 5/342; B07C 5/3425; B07C 5/3427

USPC ......................................................... 209/577
See application file for complete search history.

(56) References Cited

U.S. PATENT DOCUMENTS

2024/0151652 A1\* 5/2024 Alpeter ................ B07C 5/3427

\* cited by examiner

Primary Examiner — Terrell H Matthews
(74) Attorney, Agent, or Firm — Stanzione & Associates, PLLC; Patrick Stanzione

(57) ABSTRACT

A system of multiple sets of optical Detection And Removal Assessment (DARA) (or Scannable Detection And Removal Assessment (DARA)) standards embedded with a foreign body of various compositions with known characteristics covering a broad gradation range relevant to end product application performance requirements, the standards being used for measuring the efficiency of an optical sorting system (or scannable sorting system) to remove product defectives from the processing stream. In addition, the DARA system of standards are endowed with specifically designed characteristics which stand out from normal products or materials after the sorter processing is complete to enable easy retrieval and reuse of the standards.

19 Claims, 3 Drawing Sheets
(1 of 3 Drawing Sheet(s) Filed in Color)

DETECTION AND REMOVAL ASSESSMENT (DARA) SYSTEM OF STANDARDS FOR SORTING SYSTEMS

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71(d).

BACKGROUND OF THE INVENTIVE CONCEPT

1. Field of the Invention

The present inventive concept relates to a detection and removal assessment (DARA) system of standards used to measure the sorting efficiency of a sorting system. More particularly, but not exclusively, this inventive concept relates to standards with specifically designed characteristics which stand out from normal products or materials being processed within a sorting stream to measure the sorting efficiency of a sorting system.

2. Description of the Related Art

Products and materials are manufactured in mass production with the intent to be consistent and sold in the market. Also, foods are processed with the intent to provide quality, and placed in the market for consumption. However, these products and materials are often manufactured with defects with inconsistent sizes, composition, color and quality, and foods are sometimes processed with imperfections disposed therein which can be harmful when eaten. As such, optical and X-ray sorter systems are used in an attempt to separate defective products or materials from normal products or materials. However, these optical and X-ray sorter systems do not completely remove all types of defects from normal products and materials, or foods, and as a result defective manufactured products and materials, and foods, often pass through these sorter streams and are sold on the market together with the normal products, materials and foods.

Accordingly, there is a need for a system that can determine the visual defect removal efficiency of optical sorter systems.

There is also a need for a system that can determine a non-visual defect removal efficiency of X-ray sorter systems.

There is also a need for a system consisting of standards, which are similar in form to normal products and/or materials containing types of defects which impact the performance of normal products and materials, that can be directly introduced to an optical sorter product processing stream.

There is also a need for a system consisting of standards, which are similar in form to normal products and/or materials containing types of defects which impact the performance of normal products and materials, that can be directly introduced to an X-ray sorter product processing stream.

There is also a need for a system consisting of standards, which are similar in form to normal foods containing types of defects which impact the quality, that can be directly introduced to an optical sorter food processing stream.

There is also a need for a system consisting of standards, which are similar in form to normal foods containing types of defects which impact the quality, that can be directly introduced to an X-ray food processing stream.

There is also a need for a system of standards with representative externally embedded defects which can be added to the optical sorter system product process stream that are not externally distinguishable from the products or materials being sorted beyond the embedded defect, but do possess a characteristic that can be easily observable after sorting is complete to facilitate retrieval and reuse thereof.

There is also a need for a system of standards with representative internally embedded defects which can be added to an X-ray sorter system product process stream that are not externally distinguishable from the products or materials being sorted beyond the internally embedded defects, but do possess a characteristic that can be easily observable after sorting is complete to facilitate retrieval and reuse thereof.

SUMMARY OF THE INVENTIVE CONCEPT

The present general inventive concept relates to detection and removal assessment (DARA) system standards which can be used for measuring the efficiency of an optical and X-ray sorting systems to remove defective materials from the sorter process stream. More particularly, but not exclusively, this inventive concept relates to the DARA system of standards with specifically designed characteristics that stand out from normal products or materials being processed through optical and X-ray sorter systems.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a system including sets of optical Detection And Removal Assessment (DARA) standards usable to quantitatively determine a visual defect removal efficiency of an optical product sorting system which sorts out defects from among normal product, the system comprising: at least one set of standards, with each individual standard comprising: an outer body with a size, shape, color, texture and clarity of normal product being processed through an optical sorting system; an artificial defect embedded into a surface of the outer body and having a specific known characteristic; and an external coating configured to be indistinguishable from normal products or materials during the optical sorting process, but detectable when subjected to ultra-violet light to create a visual contrast from the normal products or materials being sorted for defects.

In an exemplary embodiment, the at least one set of standards includes a plurality of sets of standards, with each set of standards including at least ten standards representing a known gradation of the characteristic identified as a defect within a narrow precision range of +/−10%.

In another exemplary embodiment, the known gradation of the characteristic identified as a defect can be a characteristic of size, color or opacity.

In another exemplary embodiment, the artificial defect characteristic gradation range is configured based on the defects which occur on a product or material to be sorted for defects.

In still another exemplary embodiment, within each of the sets of standards the artificial defects have the same size, and the different sets of standards include artificial defects ranging in size from 50 to 3000 micro-meters (μm).

In yet another exemplary embodiment, the outer body of each standard may be composed of a polymer matrix.

In yet another exemplary embodiment, the polymer matrix can be polyethylene.

In still another exemplary embodiment, the artificial defects can be formed of a carbon black filled polyethylene.

In yet another exemplary embodiment, the external coating of the standards can comprise an ultra-violet fluorescing pigment.

In yet another exemplary embodiment, the ultra-violet pigment can be suspended in dimethyl ether, methanol/acrylate copolymer.

The foregoing and/or other features and utilities of the present general inventive concept may also be achieved by providing a system of plural groups of optical Detection and Removal Assessment (DARA) standards sets used to quantitatively determine a visual defect removal efficiency of an optical sorting system, with each group comprising: a plurality of sets of standards of the same size, each standard including: a polymer matrix body having approximately the same shape, color, texture and clarity of a product or material to be sorted by an optical sorting system; a foreign body having specific dimension embedded into a surface of the polymer matrix; and an external coating configured to be indistinguishable from normal products or materials during the optical sorting process, and configured to fluoresce with a distinctive color different from the product or material to be sorted by the optical sorting system under ambient light conditions when exposed to an ultra-violet light.

In an exemplary embodiment, the polymer matrix can be formed of polyethylene, and the foreign body is a sphere formed of carbon black filled polyethylene.

In another exemplary embodiment, the external coating can be formed of an ultra-violet pigment suspended in dimethyl ether/methanol/acrylate copolymer.

In still another exemplary embodiment, the specific dimension of each embedded foreign body is within a size range of +/−10%.

In yet another exemplary embodiment, standards within a specific set of standards are configured to have the same size of the foreign bodies embedded thereon, while subsequent sets of standards include foreign bodies ranging in size from 50 to 3000 micro-meters (μm).

In still another exemplary embodiment, the specific dimension of each embedded foreign body within a set of standards is within a size range of +/−10%.

The foregoing and/or other features and utilities of the present general inventive concept may also be achieved by providing a method of making sets of optical Detection and Removal Assessment (DARA) standards configured to quantitatively determine the visual defect removal efficiency of an optical product sorting system, the method comprising: forming bodies having approximately a same shape, color, texture and clarity as a product or material to be sorted by an optical sorting system; embedding a foreign element having specific dimension into a surface of each body; and coating each body with a pigment that is indistinguishable from normal products or materials during the optical sorting process and fluoresces with a distinctive color different from the product or material to be sorted by the optical sorting system when exposed to an ultra-violet light.

In an exemplary embodiment, the foreign element embedded within each body is formed to be within a size range of +/−10%.

In still another exemplary embodiment, the standards within a set of optical Detection and Removal Assessment (DARA) standards are formed to be the same size, and subsequent sets of optical (DARA) standards with respect to each other range in size from 50 to 3000 micro-meters (μm).

BRIEF DESCRIPTION OF THE DRAWINGS

The application file contains at least one drawing executed in color. Copies of this patent application with color drawing.

Figure 1:
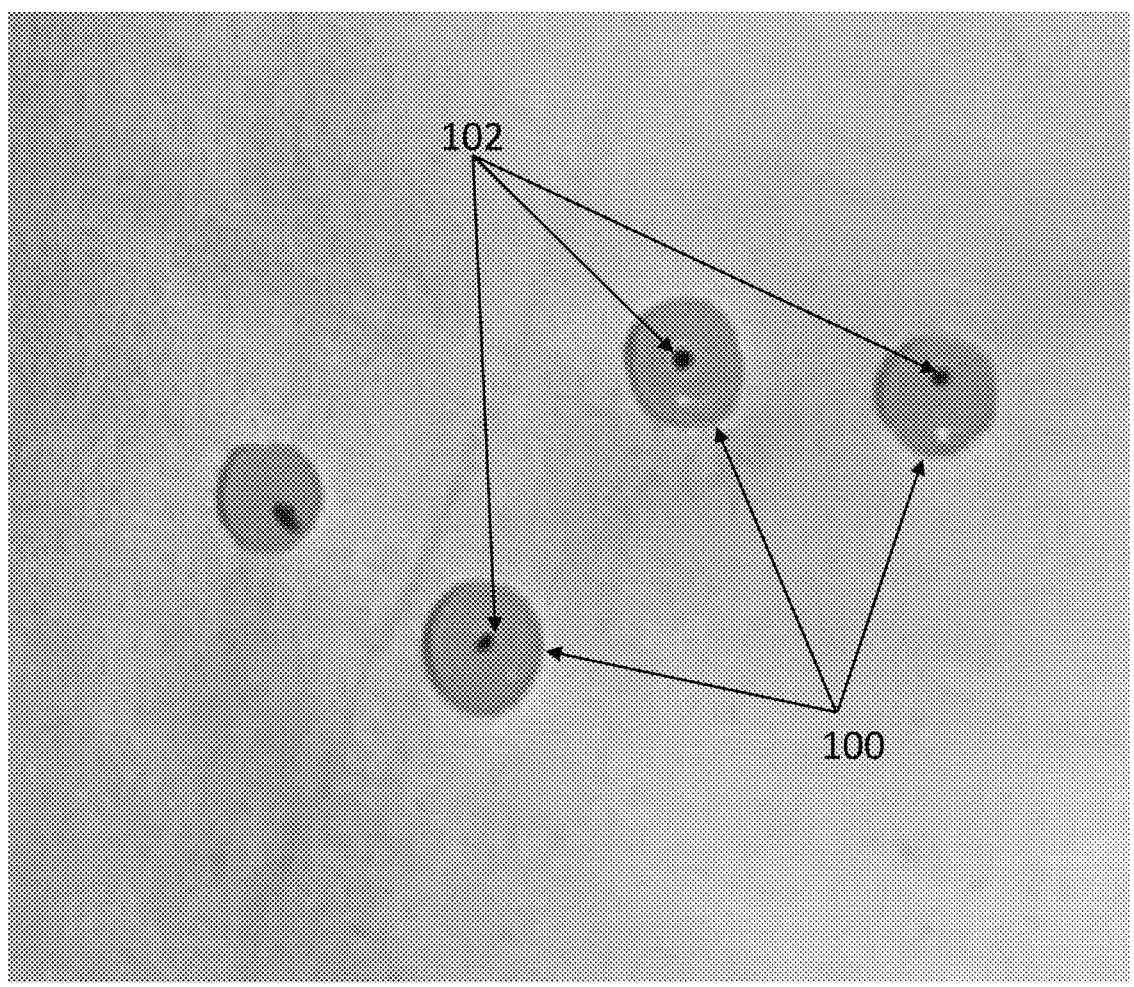
Figure 2:
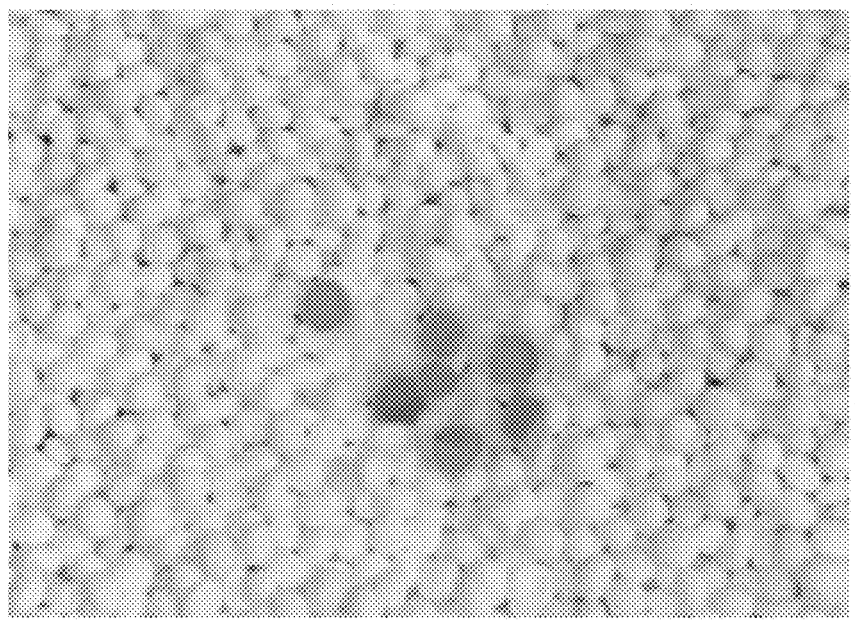
FIG. 2, is being provided by the Office upon request and payment of the necessary fee.
Figure 3:
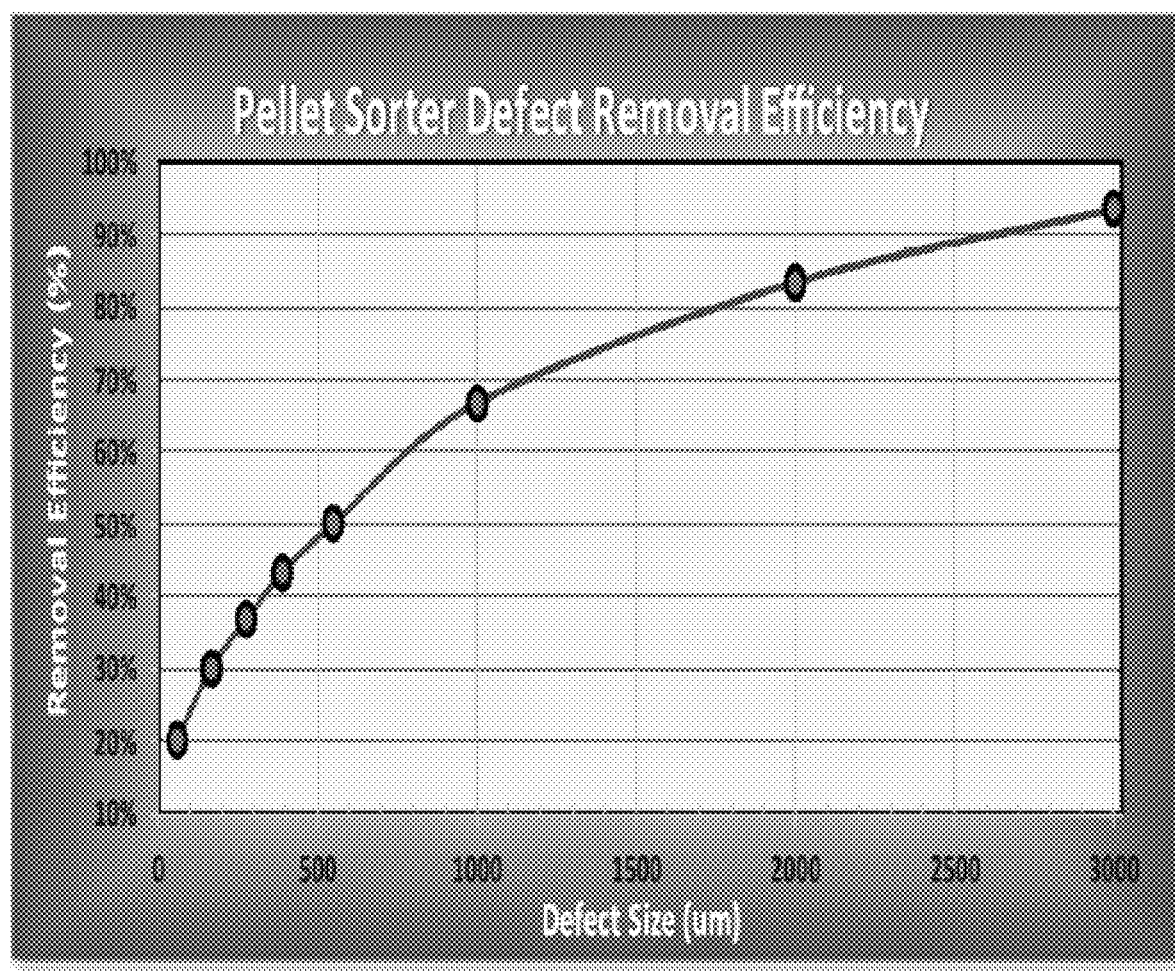

These and/or other features and utilities of the present inventive concept will become apparent and more readily appreciated from the following description of the embodiments, taken in conjunction with the accompanying drawings of which:

FIG. 1 illustrates a plan view of several representative optical DARA system of standards in the form of polymer pellets with specifically designed artificial defects embedded on an outer surface thereof, according to an exemplary embodiment of the present inventive concept;

FIG. 2 illustrates a plan view of several representative DARA system of standards in the form of polymer pellets with an embedded defect on a surface thereof and having a coating that fluoresces, in accordance with an exemplary embodiment of the present inventive concept; and FIG. 3 illustrates a representative efficiency curve which results from quantifying the percentage of several different sets of DARA standards in the form of polymer pellets as illustrated in FIG. 1 embedded thereon with a broad range of defect sizes removed by the optical sorter system.

The drawings illustrate a few example embodiments of the present inventive concept, and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to accompanying drawings.

Example embodiments of the present general inventive concept are depicted in the form of standards with specifically designed characteristics which stand out from normal products or materials within sorter process streams. More specifically, the present general inventive concept is depicted in the form of standards with specifically designed characteristics which include specifically formed defects embedded thereon, or therein, and also include an external coating formed thereon which can change color to create a visual contrast from normal products or materials being processed through an optical or X-ray sorter system.

Standards are defined in this specification as artificially formed objects which represent a product, material or foods to be entered into a product, material or food sorting stream used to sort such products, materials or foods for defects. For example, in the case where small particles of plastics (the product) are tested for defects by processing the particles through a sorter stream, the standards, according to an exemplary embodiment of the present inventive concept, are manufactured as polymer pellets having substantially the same size, shape, color, texture and clarity as a normal product to be tested, but also include a defect embedded on a surface thereof, when intended to be used with an optical sorter system. Alternatively, in the case where materials or foods are tested for internal defects, the standards, according to another exemplary embodiment of the present inventive concept, are manufactured as polymer pellets having substantially the same size, shape, color, texture and clarity as normal samples of materials of food to be tested, but also include a specifically designed defect embedded therein, when intended to be used with X-ray or other internally scannable sorter systems.

FIG. 1 illustrates a plan view of a specifically designed representative optical detection and removal assessment (DARA) system of standards depicted in the form of polymer pellets 100. These pellets 100 can be formed by passing molten polymer through a die affixed to an extruder and cut into relatively equally sized segments. These pellets 100 are also formed to include specifically designed artificial defects 102 with known characteristics (i.e., maximum axis length) embedded into a surface thereof, according to an exemplary embodiment of the present inventive concept. These defects 102 are configured to have a range of sizes, shapes, colors and clarity similar to typical various defects that may arise during the production of normal products (such as plastics) and materials being processed by an optical sorter system, in accordance with an exemplary embodiment of the present inventive concept. These defects 102 are designed and certified to be within a narrow size range of +/−10% in order to ensure consistency. The example variable defect 102 characteristic embedded into a surface of the representative optical DARA system of standards, depicted in the form of polymer pellets 100, preferably range in size from 50 to 3000 micro-meters (um) in order to provide a broad range for the sorter defect removal efficiency curve. In other words, although each of the defects 102 embedded into the surface of a of representative optical DARA system of standards, as depicted in the form of polymer pellets 100 (see FIG. 1), are provided with a narrow size range of +/−10% to ensure consistency in assessing the detection and removal of defects within this size range by the optical sorter system, for the type of product or material being processed through an optical sorter system, the overall optical DARA system of standards consists of separate groups of standards (i.e., pellets) 100 containing different sizes. More specifically, each group of standards include consistent sizes of 50 μm . . . 100 μm . . . 1000 μm . . . 3000 μm, depending on the products or materials to be processed through an optical sorter system. Furthermore, one group of optical DARA system of standards (pellets) 100 can have a set of standards including defects with a maximum axis length of 50 μm embedded thereon within a narrow size range of +/−10%, while the same group of optical DARA system of standards (pellets) 100 can have a set of standards including defects with a maximum axis length of 1000 um embedded therein within a narrow size range of +/−10%, etc.

For the case where optical sorter systems are being used, each defect 102 is permanently embedded into a surface of a standard 100 in order to protect the defect 102 from external abrasions or contacts which might dislodge the artificial defect 102, yet are detectable on a surface thereof. Alternatively, according to another exemplary embodiment of the present inventive concept, for X-ray and other internally capable scanning sorter systems, each defect 102 is completely embedded inside a standard 100, yet is configured to be detected by the X-ray or other internally capable scanning sorter system. In an exemplary embodiment, a defect 102 embedded inside a standard 100, intended to be used in an X-ray or other internally capable scanning sorter system, can be comprised of a small metal or lead ball bearings.

The following description is within reference to a system of standards configured for an optical sorter system, and therefore will be referred to as an optical detection and removal assessment (DARA) system of standards. The representative optical DARA system of standards, as depicted in the form of polymer pellets 100, according to an exemplary embodiment, are intentionally embedded into a surface thereof with artificially formed defects 102 of a known maximum axis length in order to quantitively determine the defect removal efficiency of such an optical sorting system. The representative defects 102 embedded into a surface of a standard 100 can, for example, be in the form of a sphere composed of carbon black filled polyethylene. However, any alternative equivalent type of material may be used for the defects 102, which will provide the intended purposes as described herein, without departing from the spirit and scope of the overall present inventive concept.

The defective pellets 100 representing the optical DARA system of standards, according to an exemplary embodiment of the present inventive concept, can consist of a three component system: 1) a polymer matrix body having a shape, color, texture and clarity of normal products or materials being processed by an optical sorting system; 2) a foreign body of various compositions with known characteristics embedded into the surface of the optical DARA standards; and 3) an external coating which is configured to change color when being subjected to ultra-violet (UV) light, thus creating a visual contrast from the normal product or material to be passed through a defect sorter system.

The composition of the polymer matrix body, as represented by the pellets 100 according to an exemplary embodiment of the present inventive concept, can consist of, for example, polyethylene. However, any alternative equivalent type of material may be used to represent the product form as depicted by the pellets 100, which will provide the intended purposes as described herein, without departing from the spirit and scope of the overall present inventive concept.

FIG. 2 illustrates a plan view of a set of representative optical DARA system of standards (pellets) 100 with an embedded defect 102, wherein the optical DARA system of standards (pellets) 100 fluoresce, in accordance with an exemplary embodiment of the present inventive concept. Each optical DARA standard (pellet) 100, with an embedded defect 102, preferably includes a special coating which is not detected within the visible spectral range of optical cameras typically used in optical sorting systems, and yet is configured to fluoresce with an easily observable distinctive color under ambient lighting conditions when exposed to a unique wavelength (365 nm) of light from a hand-held portable black light 204. In other words, the external coating can change color when subjected to UV light, creating a visual contrast from normal products being processed by an optical sorting system. This special fluorescent coating on the optical DARA system of standards 100 is long lasting and facilitates recovery from either the accept stream or reject stream of an optical sorting system, enabling the quantification and determination of the percentage of optical DARA system standards (pellets) 100 rejected by the optical sorting system. This coating on the optical DARA system of standards (pellets) 100 can be made of an ultra-violet (UV) pigment suspended in dimethyl ether/methanol/acrylate copolymer. However, any alternative equivalent type of material may be used for the coating of the optical DARA system of standards (pellets) 100, which will provide the intended purposes as described herein, without departing from the spirit and scope of the overall present inventive concept. This special fluorescent coating is also provided on the standards configured for X-ray and other internally scannable defect sorting systems.

A representative optical DARA system of standards 100 comprises a plurality of groups of standards 100, one group including standards 100 having the same shape, color, texture and clarity of a normal product having a size as one of 50 to 3000 micro-meters (μm), for example, 50 μm, another group including standards 100 having the same shape, color, texture and clarity of a normal product having a size as another one of 50 to 3000 micro-meters (μm), for example, 100 μm, another group including standards 100 having the same shape, color, texture and clarity of a normal product having a size as yet another one of 50 to 3000 micro-meters (μm), for example, 200 μm, etc. Within each group of the optical DARA system of standards 100 are a plurality of sets of standards 100, wherein each set of standards 100 includes at least ten standards 100. Each of the standards in a set of standards 100 is embedded onto a surface thereof with a defect 102 having a size within a narrow precision range of +/−10%. Furthermore, of the standards 100 in one set of standards 100 include defects 102 having a different size from the standards in another one of the sets of standards 100. By providing a plurality of sets of standards 100 each having standards 100 therein with a different size defect 102 from the other sets of standards an accurate assessment of the efficiency of detection and rejection of different size defects can be determined. More specifically, a first set of ten standards 100 having defects 102 of a predetermined size may be added to a defect sorting system, and then a second set of ten standards 100 having defects 102 of a different size may be added to the defect sorting system, and then a third set of ten standards 100 having defects 102 of a different size may be added to the defect sorting system, etc. After all the sets of standards 100 have passed through the defect sorting system, all of the sets of standards 100 that were detected while passing through the sorting system can be collected from a defect collection bin of the sorting system by the use of an ultra-violet light. Then the number of different size defects 102 that were detected and routed to the defect rejection bin can be counted to provide a percentage of defects detected and rejected for each size of defects, thus providing information as to the efficiency of the defect sorting system with respect to the for each size of defects that occur in the product being sorted.

FIG. 3 illustrates a defect removal efficiency curve which results from quantifying the percentage of optical DARA system of standards 100 removed by the optical sorter system across various known iterations of the defect characteristic; such as defect 102 maximum axis length. Along the Y-axis is defined the removal efficiency from 0-100%, and along the X-axis is the example defect 102 characteristic of maximum axis length of 3000 in micro-meters (μm). As pointed out above, the resulting efficiency curve can be used to determine the actual capability of a specific optical sorter system to remove defective product containing a characteristic defect represented within the range of iterations covered by the various groups of optical DARA system standards.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A system including sets of optical Detection And Removal Assessment (DARA) standards usable to quantitatively determine a visual defect removal efficiency of an optical product sorting system which sorts out defects from among normal product, the system comprising:
   at least one set of standards, with each individual standard comprising:
      an outer body with a size, shape, color, texture and clarity of normal product being processed through an optical sorting system;
      an artificial defect embedded into a surface of the outer body and having a specific known characteristic; and
      an external coating configured to be indistinguishable from normal products or materials during the optical sorting process, but detectable when subjected to ultra-violet light to create a visual contrast from the normal products or materials being sorted for defects.

2. The system of DARA standards according to claim 1, wherein the at least one set of standards includes a plurality of sets of standards, with each set of standards including at least ten standards representing a known gradation of the characteristic identified as a defect within a narrow precision range of +/−10%.

3. The system according to claim 2, wherein the known gradation of the characteristic identified as a defect is a characteristic of size, color or opacity.

4. The system of DARA standards according to claim 2, wherein the artificial defect characteristic gradation range is configured based on the defects which occur on a product or material to be sorted for defects.

5. The system of DARA standards according to claim 4, wherein within each of the sets of standards the artificial defects have the same size, and the different sets of standards include artificial defects ranging in size from 50 to 3000 micro meters (μm).

6. The system of DARA standards according to claim 1, wherein the outer body of each standard is composed of a polymer matrix.

7. The system of DARA standards according to claim 6, wherein the polymer matrix is polyethylene.

8. The system of DARA standards according to claim 1, wherein the artificial defects are formed of a carbon black filled polyethylene.

9. The system of DARA standards according to claim 1, wherein the external coating of the standards is comprised of an ultra-violet fluorescing pigment.

10. The system of DARA standards according to claim 9, wherein the ultra-violet pigment is suspended in dimethyl ether, methanol/acrylate copolymer.

11. A system of plural groups of optical Detection and Removal Assessment (DARA) standards sets used to quantitatively determine a visual defect removal efficiency of an optical sorting system, with each group comprising:
    a plurality of sets of standards of the same size, each standard including:
        a polymer matrix body having approximately the same shape, color, texture and clarity of a product or material to be sorted by an optical sorting system;
        a foreign body having specific dimension embedded into a surface of the polymer matrix; and
        an external coating configured to be indistinguishable from normal products or materials during the optical sorting process, and configured to fluoresce with a distinctive color different from the product or material to be sorted by the optical sorting system under ambient light conditions when exposed to an ultra-violet light.

12. The system of DARA standards according to claim 11, wherein the polymer matrix is formed of polyethylene, and the foreign body is a sphere formed of carbon black filled polyethylene.

13. The system of DARA standards according to claim 11, wherein the external coating is formed of an ultra-violet pigment suspended in dimethyl ether/methanol/acrylate copolymer.

14. The system of DARA standards according to claim 11, wherein the specific dimension of each embedded foreign body is within a size range of +/−10%.

15. The system of DARA standards according to claim 14, wherein standards within a specific set of standards are configured to have the same size of the foreign bodies embedded thereon, while subsequent sets of standards include foreign bodies ranging in size from 50 to 3000 micro-meters (um).

16. The system of DARA standards according to claim 15, wherein the specific dimension of each embedded foreign body within a set of standards is within a size range of +/−10%.

17. A method of making sets of optical Detection and Removal Assessment (DARA) standards configured to quantitatively determine the visual defect removal efficiency of an optical product sorting system, the method comprising:
    forming bodies having approximately a same shape, color, texture and clarity as a product or material to be sorted by an optical sorting system;
    embedding a foreign element having specific dimension into a surface of each body; and
    coating each body with a pigment that is indistinguishable from normal products or materials during the optical sorting process and fluoresces with a distinctive color different from the product or material to be sorted by the optical sorting system when exposed to an ultra-violet light.

18. The method according to claim 17, wherein the foreign element embedded within each body is formed to be within a size range of +/−10%.

19. The method according to claim 17, wherein the standards within a set of optical Detection and Removal Assessment (DARA) standards are formed to be the same size, and subsequent sets of optical Detection and Removal Assessment (DARA) standards with respect to each other range in size from 50 to 3000 micrometers (um).

* * * * *